United States Patent [19]

Bienvenu

[11] 4,338,169

[45] Jul. 6, 1982

[54] PROCESS FOR PROMOTING PHYSICAL AND/OR CHEMICAL REACTIONS PERFORMED IN A FLUID MEDIUM

[75] Inventor: Gerard Bienvenu, Annemasse, France

[73] Assignee: Extramet, Annemasse, France

[21] Appl. No.: 112,596

[22] Filed: Jan. 16, 1980

[30] Foreign Application Priority Data

Jan. 17, 1979 [FR] France .................................. 79 01061

[51] Int. Cl.³ .......................... C25C 1/12; C25C 1/16; C25C 1/06
[52] U.S. Cl. ................................. 204/155; 204/105 R; 204/107; 204/108; 204/112; 204/113; 260/409
[58] Field of Search .................. 204/155, 105 R, 108, 204/107, 112, 113, DIG. 5, 222, 73 R, 73 A, 74–77; 75/109, 117, 119, 101, 120; 260/667

[56] References Cited

U.S. PATENT DOCUMENTS

| 2,352,791 | 7/1944 | Krumboltz | 204/155 |
| 3,374,087 | 3/1968 | Gray | 204/155 |
| 3,440,731 | 4/1969 | Tuthill | 204/155 |
| 4,032,425 | 6/1977 | Kametani | 204/222 |

*Primary Examiner*—R. L. Andrews
*Attorney, Agent, or Firm*—Felfe & Lynch

[57] ABSTRACT

The process comprises subjecting a magnetic material dispersed in the fluid to the action of a variable magnetic field. It is thus possible to provide efficient stirring of this fluid and to facilitate reactions taking place, between a constituent of the fluid medium, and particles dispersed in this fluid, including a substance at least partly active at the surface. They may be, in particular, a ferromagnetic solid substance and a compound in solution in the fluid and non-magnetic.

18 Claims, 10 Drawing Figures

PROCESS FOR PROMOTING PHYSICAL AND/OR CHEMICAL REACTIONS PERFORMED IN A FLUID MEDIUM

BACKGROUND OF THE INVENTION

The invention relates to the exploitation of the effects of magnetic fields on matter for industrial purposes, for applying physical and chemical reactions in a dispersed medium.

It is a particular object of the invention to provide a process which permits physical and/or chemical reactions to be facilitated, in a fluid medium and which consists essentially in subjecting to a variable magnetic field, a magnetic material in freely dispersed form in this fluid, constituted, at least at the surface, of a substance playing a physical and/or chemical role in said reaction.

The magnetic material can be in the form of particles or elements of any shape and of any size, according notably to the application contemplated and the dimensions of the container or of the reactor containing the fluid medium. These particles or elements are not necessarily constituted by a homogeneous solid substance; they may also include portions of different nature, one against the other or one within the other. In practice, this enables any substance whatever to be rendered magnetic for the process of the invention, for example by using mixtures or, preferably, by forming particles or elements enclosing a core of a common magnetic material, coated with a surface layer of a substance selected separately according to the constituents present in the medium and the role which is ascribed to it in the reaction. Materials qualified as magnetic within the scope of the invention are principally ferromagnetic materials, such as soft iron and iron ores, but also possibly strongly paramagnetic materials, the essential being that the dispersed material moves selectively within the fluid medium under the effect of the magnetic field.

The magnetic field may be created by any conventional means, in one or several directions, provided that it is possible to vary it, in intensity and/or in position or direction. Preferably sufficiently intense magnetic fields are used, with sufficiently rapid variations, to maintain the ferromagnetic material effectively in suspension in the fluid and subjecting it to accelerations substantially higher than those that it can undergo for other reasons, for example due to the force of gravity.

It is possible, in particular, to create a magnetic field, transversally with respect to gravity, by means of different electromagnetic coils arranged outside a container or reactor containing the fluid medium and the magnetic material. These coils may be at least two in number, preferably more, distributed around the receiver or reactor at the same level. The apparatus then advantageously includes control means for the supply of the coils, conventional in themselves, enabling various coils to be successively or alternately supplied with D.C. or alternating currents. It is also possible to arrange similar coils on a least two different levels of the apparatus. Preferably, the coils are then arranged by placing opposite poles above one another, in the same way as adjacent poles around the container or reactor are advantageously opposite poles. The various coils may be supplied successively in random manner or in any other periodic form.

In other cases, it may be advantageous to arrange electro-magnets successively in the path that the magnetic material follows in the absence of a magnetic field and to supply the electro-magnets cyclically one after the other so as to draw the magnetic material in reverse direction to the above path. This arrangement may be advantageous, in particular, when the magnetic material is constituted by particles in suspension in a fluid flowing continuously in a certain direction, and especially where it relates to fine particles entrained with this fluid in the form of a mud. In other cases, it is preferred on the contrary to control the supply of the electro-magnets alternately so as to cause to and from movements of the particles with respect to the path of the fluid. In addition, it is often advantageous to interrupt the magnetic field created in each direction concerned periodically, the magnetic material then being drawn, during the interruption fo the fields, by the other forces to which they may be subjected, for example by entrainment by the flow of fluid, by the rising force of the fluidized beds or by the action of gravity. However in this case as in the preceeding ones, there is every interest in preserving at least a periodic alternation between fields of opposite sense in at least neighbouring directions, or even in the same direction, preferably transverse with respect to the direction in which the resultant of the other possible forces of entrainement of the dispersed material is exerted. One thus arrives easily at realizing alternating variations of acceleration which counter any possibility of organization of the particles in a continuous flow at a constant linear speed.

SUMMARY OF THE INVENTION

It has already been proposed to utilize a variable electric field, by acting on a magnetic material dispersed in a fluid medium, to ensure stirring and mixing of this medium or the transportation of the material. However it has always been considered essential to have this material completely inert with respect to the components in presence, and if necessary for that purpose, the magnetic metallic particles are coated with a layer of inert polymer material. The invention preserves the advantages of efficient and homogeneous stirring throughout the mass, but it adds thereto a contribution from magnetic phenomena in the reactions occuring in contact with the dispersed material.

According to the invention and moreover to a preferred embodiment thereof, the magnetic divided material driven by the variable magnetic field is at least partially and superficially constituted by a solid substance taking part in the reaction, by a chemical and/or physical effect. It is understood therefrom that the invention is applied with general industrial interest particularly in the application of reaction involving a fluid, notably a liquid, and a magnetic divided solid substance. It must be understood here that a solid active substance involved in a physical or chemical reaction may be naturally magnetic itself, or that it may be rendered magnetic by incorporation of a magnetic element or compound.

In general, the variable magnetic fields applied according to the invention facilitate the utilization of all sorts of reactions which are carried out in a dispersed medium. These reactions may be purely physical, such as mixings, separations, certain operations of solution or precipitations, or physiochemical such as adsorptions, catalytic effects, other placings in solution or precipitations, or rather chemical such as oxido-reduction reactions or electrochemical exchanges. The same reaction may also follow at the same time different types of physical or chemical actions, which may become facilitated simultaneously, in combination with one another, by the effect of variable magnetic fields on the dispersed medium. The examples of reactions mentioned here are in no way limiting, no more than the particular applications which will be contemplated in the following and whose diversity will on the contrary show up the multitude and the variety of the applications of the process according to the invention.

In the various reactions applied, the solid and liquid phases may be simple or complex. A dispersed solid phase may be constituted by one or by several different materials, of which one is advantageously magnetic in the preferred embodiments of the invention. A fluid phase may be formed from gas or gaseous mixture, or from a liquid, or again by a mixture of gas and liquid. Preferably, it relates principally to a liquid, which may be constituted notably by one or several compounds in solution in a solvent such as water. The reaction medium may also be formed of immiscible liquids dispersed in one another. The solid and fluid phases may be selected so as to be substantially immobile with respect to one another in the absence of variations of magnetic fields created in the process of the invention, but most often a solid phase is held in suspension in the fluid, already in the absence even of a magnetic field, notably by dispersion or fluidization of solid particles in the fluid medium by imparting to the fluid particles body a particular motion by any particular method of hydrodynamic flow.

As a result the invention applies particularly to carrying out any reactions which are already effected conventionally in a dispersed medium, but which will profit from subjecting the reaction medium to the variable fields of the invention, especially when it contains magnetic solid particles taking part at least at the surface in a chemical reaction, either as a starting product of the reaction, or as a resulting product, or again as a product facilitating the reaction without appearing directly in the chemical equilibrium equation, for example by catalytic action. In this domain, the invention is applied particularly advantageously to various treatments of magnetic ores in an aqueous medium and to various electrochemical exchange reactions with dissolution or deposition of a metal either itself magnetic, or coating magnetic particles, in particular to lixiviation and cementation treatments, as well as to heterogeneous catalysis reactions.

The advantages of the process of the invention applied to such reactions seem due, at least for one part, to an intense stirring action of the particles in the reaction medium and to its homogeneous distribution throughout the whole mass. However it has been observed also that to this effect which may be qualified as mechanical, or microscopic, is added a local physicochemical effect, in a way a microscopic effect, which occurs at the solid-liquid interface, under the influence of the magnetic field, between two ionic species of different magnetizabilities, and this all the more as they are moved at relatively high speed. Such a microscopic action could be the cause of the high effectiveness of the process of the invention, inexplicable by the effect of microscopic stirring alone, which is observed as soon as one applies a reaction bringing into play two substances of different magnetic properties. It can in fact be understood that the effect qualified as microscopic is especially substantial in this case. The combination of macroscopic effects and microscopic effects which has just been considered is manifested in particular by an improvement in yield, less rigorous operational conditions, or greater purity of the products obtained. However naturally, this attempt to explain the phenomena must not in any case be interpreted as limiting the invention.

As it has already been given to understand, the invention extends to any reaction carried out in a dispersed system, whatever the method of dispersion, including here notably with the application, under a variable magnetic field, of solid-fluid reactions carried out on a magnetic dispersed solids in a fixed bed. However, it has generally appeared preferable to conduct the reactions so that the variations in magnetic field participate actively, even if not preponderantly, in the establishment of a suspension of an active solid phase in the reaction, by using in addition relatively fine solid particles, subjected to sufficient magnetic fields to impose considerable differential speeds between the particles and the fluid medium. These speeds may be of a very different order of magnitude from conventional fluidized beds, so that the invention enables the combination of various advantages connected with the large exchange surface area, with the efficiency of stirring, with the considerable differential speeds and with the differences in magnetic properties. By way of example, due to very high momentary accelerations, it is possible, on ferromagnetic particles such as those of the conventional processing methods for magnetic ores in suspension in an aqueous solution, to achieve momentary speeds of several tenths of a meter per second, with relatively modest magnetic inductions, of the order of 0.1 weber per square meter, whereas in conventional fluidized beds, some centimeters per second is not exceeded.

It is also to be stressed that a beneficial effect which cannot be explained by the intervention alone of stirring of the medium is obtained even when the magnetic divided substance is not directly involved chemically in the reaction performed. In other words, the products taking part in the reaction may all be different from the magnetic material which ensures the stirring under the effect of the variable magnetic field. This is the case for instance when the surface of the particles has only an activating function for the reaction contemplated. It can act for instance as an oxidizing or reducing agent for a compound that remains in solution in both its oxidized and reduced states, or as a catalyst, or as an electrically conductive substrate in electrochemical reaction. Such is also the case when performing a reaction between two immiscible liquids having different magnetic susceptibilities, or to a chemical reaction bringing into play two compounds in solution having different magnetic properties. The latter case finds an application, for example, in the purification of zinc-containing solutions through reduction by zinc of copper in solution, which will be the subject of a detailed example of its application below, illustrating an exchange reaction between two metals having different magnetic susceptibilities when they are in solution in a solubilizing liquid medium. For the application of such reactions by the process of the invention, stirring of the fluid medium is ensured by magnetic means as already defined, using, for example, soft iron elements. The latter may be coated with a substance chemically inert with respect to the reaction medium while still retaining some physical activity, through the influence of magnetic phenomena. It is also possible to use the reducing zinc in the form of a solid coating deposited on the elements or particles of the stirring magnetic material, if necessary with the interposition of an inert layer between this coating and the magnetic substance itself.

Within the field of physical or chemical reactions involving at least two products of different magnetic properties of which one is a magnetic substance in divided form, occur notably all heterogeneous catalysis reactions using a magnetic catalyst, or one made magnetic by incorporation of a magnetic substance, and in particular hydrogenation reactions catalysed by divided nickel. The magnetic stirring of the catalyst then enables the effectiveness of the reaction to be increased. The influence of the catalyst alone on the dispersion is more than it would lead one to imagine. Below will be given an example of such physical reaction relating to the hydrogenation of fatty acids with ethylenic double bonds.

In the same domain, the invention is applied advantageously to oxidation-reduction chemical reactions and to acid attack reactions on magnetic ores. Examples will be given on the lixiviation of nickel or copper mattes, on the one hand, and of acid attack of ilmenite on the other hand. Similar oxidation-reduction reactions are shown by cementation reactions in which iron is used to displace the copper, silver or other noble metals from their solutions. In the case of iron, the cementant is ferromagnetic, but if the cementant is not magnetic, it may equally well be rendered magnetic by incorporation therein an iron core, for example. To cementation reactions belong notably deposits of magnetic metals as a partial coating on a solid active substance, or the coating of magnetic particles held in suspension by the variable fields, by an active substance initially in solution in the fluid medium. In the first case, the magnetism of the dispersed material may be due only to the gradual coating formed from a compound initially in solution and deposited on a solid support initially non-magnetic, and then held in suspension by a hydrodynamic flow such as that created in conventional fluidized beds.

These examples of the application demonstrate also combined effects, on several physical or chemical transformations, of the magnetic actuation of the divided substance according to the invention. Thus, for example, the application of the variable magnetic field to a reaction medium comprising a ferromagnetic solid in the presence of a liquid which dissolves it, for example, by an oxidation-reduction reaction or any other form of chemical attack, has not only the effect of improving the yield of the chemical reaction, of increasing its speed, or of enabling less rigorous industrial conditions, but also the separation of the products is found to be facilitated and a conservation of energy is realized by the fact that the solid substance loses its magnetization progressively with the dissolution, the non-magnetic particles no longer then being actuated by the magnetic field.

The invention is illustrated below by the examples of particular embodiments which follow, and, of course, which are not to be regarded as in any way limiting. Thus, the invention is not limited to the operational conditions which will be described within the scope of these examples. Neither is it limited to the particular applications envisaged, nor to the materials suggested for the application of the process. Quite to the contrary, the technician skilled in the art will understand, within the variety of these several particular examples, how much the possibilities of application of the invention may be varied and extend to industrial fields which may be very different from one another. A great diversity will also appear in devices with magnetic fields enabling the application of the process. All these devices as well as their modifications remain in the field of the invention.

In addition, there is described in each of the examples below a preferred apparatus for the application of the process within the field of the particular application concerned. Selection criteria for the apparatus as a function of the conditions of application will also be apparent. But here again, the various associations of apparatus with the particular methods of applying the precess are not of any limiting character, the same apparatus being utilizable for varied cases of application and vice-versa.

BRIEF DESCRIPTION OF THE DRAWINGS

In the following example, the particular installations are described with reference to accompanying FIGS. 1 to 10 in which.

DETAILED DESCRIPTION OF THE INVENTION

EXAMPLE I—Tridimensional magnetic stirrer

In the present example, a three-dimensional magnetic stirring reactor is described utilizable for the application of the process of the invention.

Figure 1:
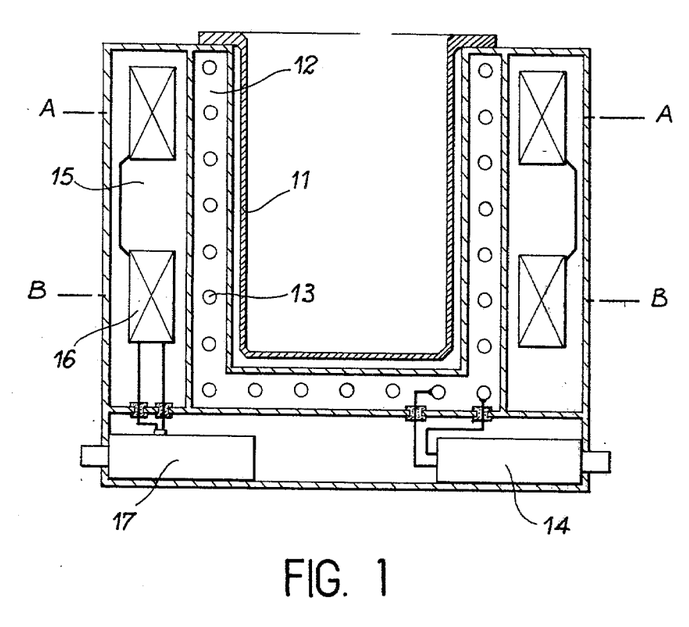
FIG. 1 shows a partial vertical section of an installation according to the invention designed for use as a reactor for any physical and/or chemical reaction. The design and use of this reactor form the subject of Example I.

The installation is shown diagrammatically in FIG. 1. It comprises a hollow body 11 of aluminum, which forms a housing in which the container of glass or of plastic material is located and in which it is desired to carry out the reaction. Near the walls of the hollow body is a heating body 12 comprising a heating resistor 13 which enables homogeneous and regulated heating through a regulating unit 14. Behind the heating body is arranged an annular housing 15 which receives four flat electro-magnets 16. This housing is separated from the heating body by thermal insulation.

Figure 2A:
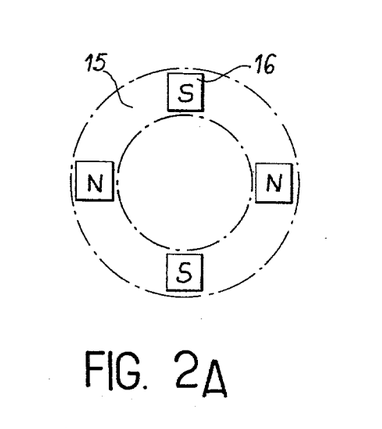
FIGS. 2a and 2b show diagrammatically the respective positions of the North (N) and South (S) poles at a particular moment in the electro-magnets of the stirrer of FIG. 1, considered in cross-section along the line AA and BB, respectively, of FIG. 1.
Figure 2B:
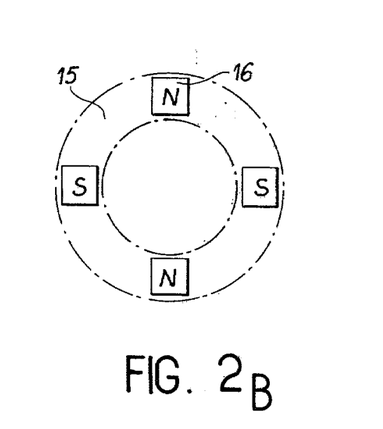

The arrangement of the electro-magnets, at angular intervals of 90 degrees from one another, is shown in FIGS. 2A and 2B. The electro-magnets are wound so that a North pole is beside a South pole. A particular pole is thus opposite a pole of the same sign at the same level, and in a vertical line with respect to a pole of opposite sign. The electro-magnets are fed simultaneously by pairs (each pair comprising two neighbouring magnets) through a supply unit 17, which comprises an electonic unit enabling each of the pairs of magnets to be supplied alternately, and the frequency of the alternations to be varied. Periodic magnetic fields are thus created alternately in different directions.

The device may be used to carry out any sort of reactions in a dispersed medium of magnetic particles.

EXAMPLE II—Purification of zinciferous solution.

The present example relates to an exchange reaction by oxidation-reduction between two metal species. In the particular case concerned, this type of reaction is exploited to purify a sulfuric zinciferous solution by reduction by the zinc of metallic impurities such as copper and cobalt that it contains. The two ionic species in solution, which are then zinc and, for example, copper, have different magnetizabilities although both are paramagnetic. The solid phase dispersed in the solution to be treated is constituted by the reducing agent, that is to say by a zinc, coated on ferromagnetic particles subjected to stirring by magnetic field.

The treatment described in this example hence contributes an improvement to conventional processes in which a zinciferous solution intended for electrolysis is subjected to a purification treatment in a fluidized bed of zinc particles.

Figure 3:
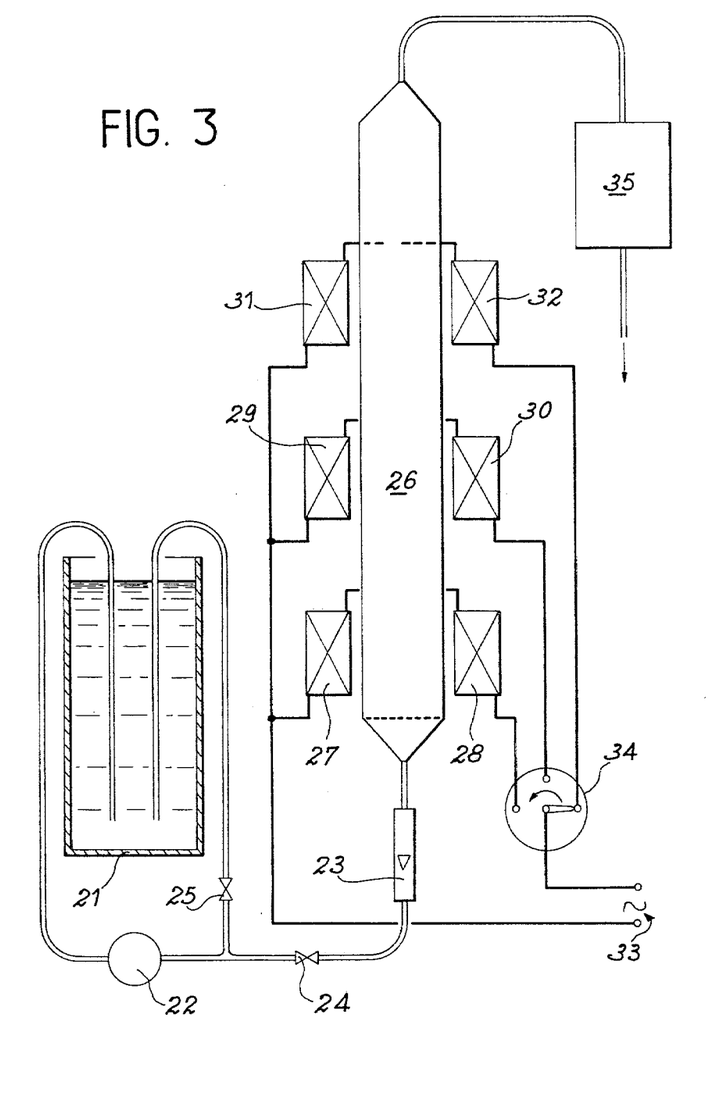
FIG. 3 represents diagrammatically an installation used within the field of purification of zinciferous solutions in Example II, as well as the method of supplying the electro-magnets associated with the reactor.

The installation used as shown diagrammatically in FIG. 3. A tank 21 contains the zinciferous solution, constituted by a sulfuric aqueous solution including the following elements:
$Zn^{++}$ 140 g/l—$Cd^{++}$ 254 mg/l—$Cu^{++}$ 176 mg/l—$Co^{++}$ 9.7 mg/l—$Sb^{++}$ 7.2 mg/l—pH of the order of 5.
Density of the solution of the order of 1.35 g/cm$^3$.

Operational temperature: 80° C.

This solution is circulated by a pump 22 and sent, under the control of a flowmeter 23 and valves 24 and 25, into a fluidized bed reactor 26 containing particles of zincated iron. This reactor is placed vertically in the air-gaps of three electro-magnets arranged at three levels one above the other, whose respective coils have been shown at 27-28, 29-30, 31-32. These electro-magnets are supplied by current reversed periodically so as to cause a rapid alternating movement of the particles through the fluidized bed.

In practice, the three electro-magnets are supplied, as shown in the figure, from a source 33 of 22 OV alternating current, through a rotary switch 34, constituted by a rotary electro-mechanical device driven by a variable speed motor, which enables the pairs of coils 31-32, 29-30, 27-28, to be supplied cyclically and successively. The switching rhythm is 3 contacts/sec. The power capacity in each pair of coils is 600 watts.

The fluidized bed has a height of 2.5 m, for a rectangular cross-section of 4 cm × 20 cm. The particles in suspension are constituted by substantially spherical iron nuclei of about 0.8 mm diameter, covered with an inert intermediate layer of polyethylene and a surface layer of zinc of 1.5 mm thickness. The flow rate of the solution through the reactor being 2.46 m$^3$/h, the porosity of the bed is under these conditions 0.64.

Tests were carried out with and without the magnetic field. The zincated iron particles were removed and replaced gradually, before the reducing zinc layer was completely destroyed, and separated from the treated solution, at the exit of the reactor, in a filter-press 35.

The composition of the treated solution, in each case, after various reaction times, is indicated below by the concentration of the metallic impurities, in milligrams per liter:

| Magnetic stirring: | NO | | | YES | | |
|---|---|---|---|---|---|---|
| Time (mn) | 10 | 20 | 30 | 10 | 20 | 30 |
| $Cu^{++}$ mg/l | 3.2 | 3.2 | 3.2 | 1 | 0.8 | 0.6 |
| $Cd^{++}$ mg/l | 3 | 3.2 | 2.7 | 0.18 | 0.06 | 0.07 |
| $Sb^{++}$ mg/l | 0.1 | 0.48 | 1.27 | 0.4 | 0.1 | 0.00 |
| $Co^{++}$ mg/l | 0.85 | 1.9 | 2.9 | 0.7 | 0.6 | 0.6 |

The composition of the cement deposited on the particles is, in the case of the test with magnetic stirring, approximately the following, by weight:
Zn 15%, Cu 34%, Cd 47%, Co 1.6%, Sb 1.2%, (various 1.2%).

EXAMPLE III—Cementation of copper.

The present example relates like the preceeding one to the operation with magnetic stirring of an exchange reaction between a metallic element in solution and a (pure or alloyed) solid metal element which is oxidized and passes into solution, but in this case the reducing metal, or cementant, is directly constituted by iron in the dispersed phase. In addition, the process is applied to the recovery of the cemented element, from its dilute solutions.

The interest of this application is connected with the fact that one is more and more led to treat very dilute copper ores, even old waste dumps titrating between 0.1 and 0.3% copper. The lixiviation operations carried out on these raw materials lead to acid solutions very dilute in copper which are not electrolysable industrially and which require a concentration step prior to electrolysis, for example by extraction by solvent in conventional processes. The process of the invention enables, by cementation on the elementary iron, the preparation, form these very dilute solutions, if necessary pre-treated by cementation on the copper to eliminate the noble metals therefrom, of copper having a high purity and utilizable directly, after remelting, for the manufacture of alloys.

Figure 4:
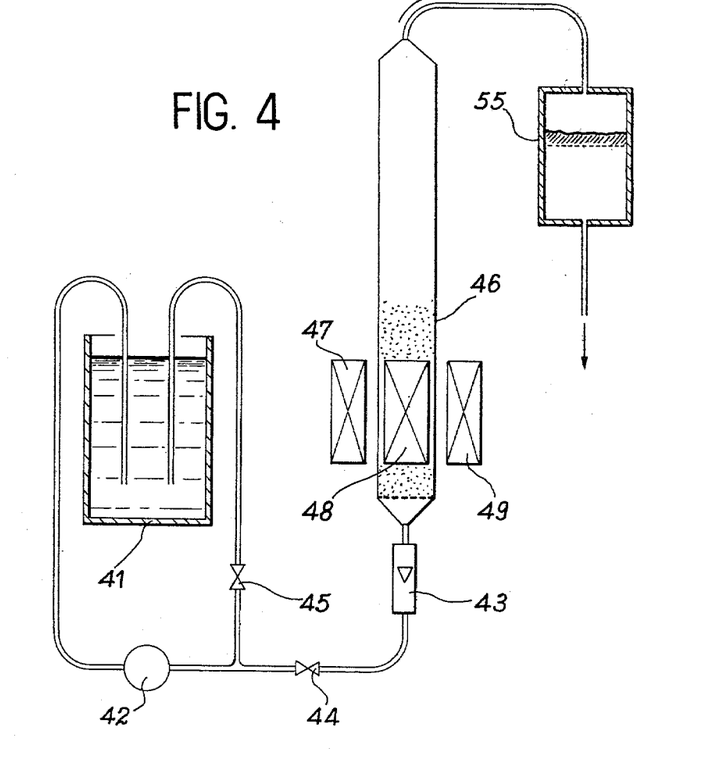
FIG. 4 shows diagrammatically an installation used for the treatment of cupriferous solutions in Example III.
Figure 5:
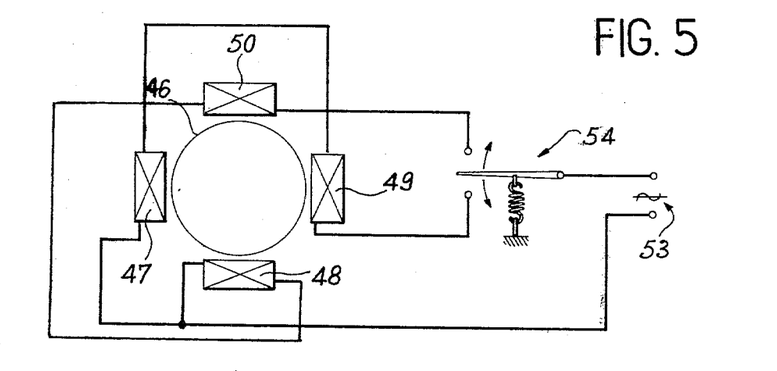
FIG. 5 shows diagrammatically the details of the method of supplying the magnetic coils associated with the reactor of FIG. 4.

The installation used is shown diagrammatically in FIGS. 4 and 5. Like the installation of FIG. 3, it includes a tank 41 containing the dilute solution, a fluidized bed reactor 46, a filter-press 55, a pump 42 to circulate the solution through the reactor and the filter-press, passing through a valve 44 and a flowmeter 43, and a branch valve 45. However the installation differs from the preceeding one in its magnetic stirring means.

In accordance with the figures, the fluidized bed in the reactor 46 is placed at the center of four electromagnetic coils 47, 48, 49, 50, distributed regularly at the same level around the reactor, at 90 degrees from one another. The coils are coupled in pairs of two diametrically opposite coils fed from a source of 220 V alternating current through a switch. The latter is constituted in any conventional manner, for example, by a strip movement under the action of a rotary cam (not shown) driven by a variable speed motor, so as to periodically connect one and the other of pairs of coils forming at each moment diametrically opposite North and South poles. Discontinuous alternating magnetic fields are created through the reactor, alternately in two perpendicular directions.

In a particular case, each pair of coils corresponds to a power to about 200 watts and the discontinuous magnetic field is applied at the frequency of 10 pulses per minutes to a fluidized bed of 100 cm² in cross-section and 10 cm in height (entirely covered by the zone of application of the magnetic field) containing particles of spheroidal iron of average diameter equal to 0.06 cm. The magnetic induction created in the heart of the bed has a value of about 0.1 tesla.

Thus a sulfuric solution at pH 1.6 containing 1 g per liter of copper and 0.256 g/l of iron, principally in a ferric state, at 22° C., are treated successively with and without the magnetic field, under the conditions and with the results shown below:

| Magnetic field | NO | YES |
| --- | --- | --- |
| Flow rate of solution l/h | 425 | 576 |
| Final solution: Cu mg/l | 44 | 0.3 |
| Fe g/l | 1.2 | 1.2 |
| Consumption of iron (g) per g Cu | 1.2 | 0.99 |
| Yield of iron % weight | 71 | 90 |
| Composition of cement: Weight Cu % | 82 | 99.2 |
| Weight Fe % | 17 | 0.3 |

The application of the magnetic field hence enables productivity to be increased by more than 40%, the consumption of iron to be reduced by 18% and a very pure copper cement to be obtained. The above yield of iron expresses the proportion (in atoms %) of dispersed iron with respect to deposited copper.

It has been possible to check experimentally the proof that with equivalent stirring, the cementation phenomenon of the copper on the iron is considerably "activated" in the presence of the magnetic field and that not only the kinetics is improved but also the purity of the copper produced and the yield of iron are increased. It is hence possible to consider that the field gradients in the vicinity of the particles and the currents induced on these same particles exert an effect favorable to the transfer of material.

In other tests, by using a fluidized bed having the same characteristics as above, a more dilute solution was treated with a flow rate and hence a porosity which was much higher. For a sulfuric solution at pH 1.6 containing 0.273 g/l of copper and 0.123 g/l of iron, the following results were obtained:

| Magnetic stirring | | NO | YES |
| --- | --- | --- | --- |
| Flow rate of solution | l/h | 867 | 1180 |
| Final solution: Cu | g/l | 0.055 | 0.046 |
| Fe | g/l | 0.386 | 0.39 |
| Iron consumption g per g Cu | | 1.55 | 1.11 |
| Yield of iron, % weight | | 57 | 80 |
| Composition of the cement: | | | |
| Fe % weight | | 27 | 99.3 |
| Cu % weight | | 71 | 0.4 |

EXAMPLE IV—Enrichment of ilmenite by acid treatment.

Ilmenite is an iron titanate of the crude formula $TiO_2FeO$. It occurs in ores mixed with other constituents such as manganese and magnesium titanates, ferrous and ferric iron oxides and other oxides such as those of silicon, aluminum, calcium, vanadium.

The ore is ferromagnetic. After enrichment by physical-chemical methods, it is at present sold to users with a content of $TiO_2$ which varies from 35% to 65%. It is possible to enrich this ore much more, but the various methods which already exist, of which the best known is carbothermic reduction which leads to "slag", have the drawback that they necessitate large investments, or that they involve very difficult operating conditions: very high temperatures, or high pressures or high concentrations of acid attack solutions.

Figure 6:
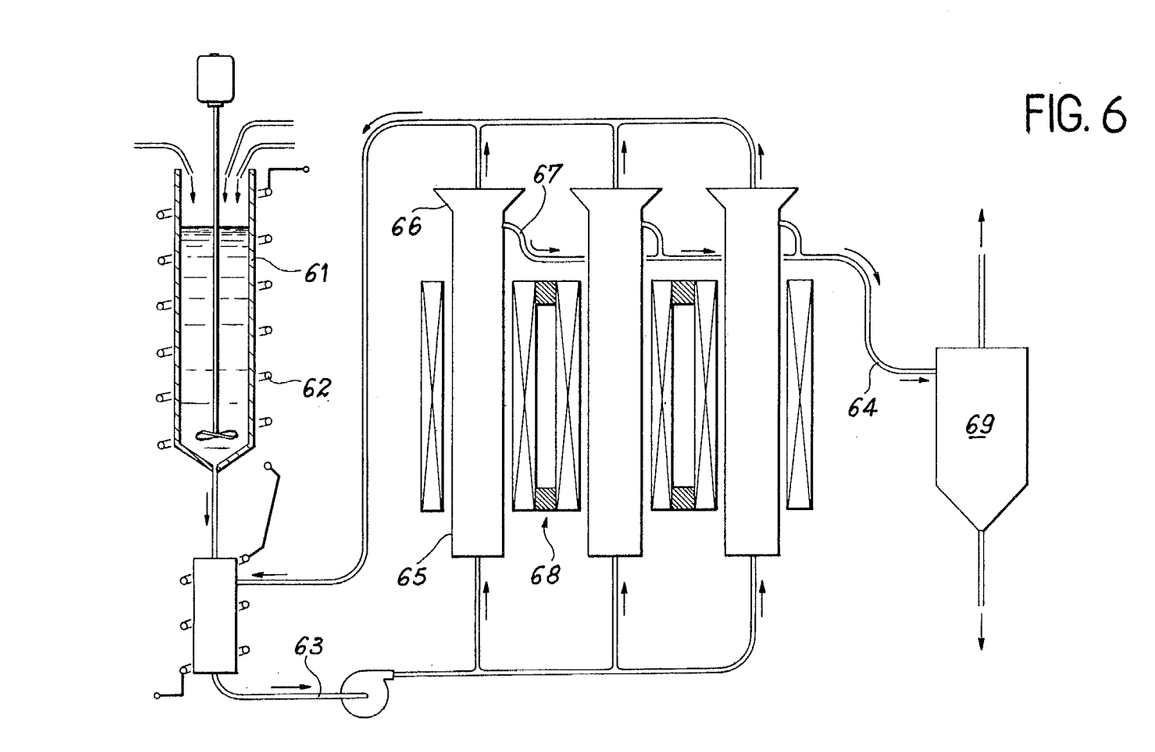
FIG. 6 shows diagrammatically, an installation with several reactors operating in parallel, used for the acid treatment of ilmenite for its enrichment in Example IV.

The present example described a more simple and less laborious method of arriving at enrichment due to the magnetic stirring process according to the invention, applied in the installation of FIG. 6, the magnetic stirring enabling the use of a more dilute acid attack solution, which can be recirculated without difficulty.

The finally ground ore is suspended with mechanical stirring, at 61, in a solution of sulfuric acid with 150 g/l, in the proportion of 15 kg of ore per 100 liters of dilute acid. The mixture is kept at an average temperature comprised between 70° C. and 65° C. and varying progressively between these values from the inlet 63 to the exit 64 from the system. This temperature is imposed by a heating circuit 62.

The suspension is sent in parallel into a series of parallelepipedic vertical reactors 65, 3 m in height, 0.30 m in width and 0.15 m in depth, of polypropylene or of pyrex. The upper portion 66 of the columns is flared in order to have a calm and clear zone from which a proportion of 90% of the flow rate of the liquid is extracted, which is then mixed with 10% of fresh suspension and recirculated to the inlet of the recovery units (at 63).

The speed of circulation is adjusted at the start so that the bed is placed in state of fluidization, its porosity being close to 0.70. The columns are equipped over a length of 2 m ( central portion of the columns) with electro-magnetic devices 68, enabling the creation of an alternating magnetic field of about 0.1 tesla. The magnetic cores of ferro-silicon are common between two adjacent columns and the windings are assembled so as to obtain an alternation of North and South poles. The coils are supplied through a power supply (not shown) driven by a function generator (not shown). The form of the current which passes through the turns of the winding is alternating of 10 Hz frequency and interrupted every ½ second for ½ second. Thus, when the magnetic field is not exerted, a certain actuation of small particles by the liquid current occurs.

The magnetic field is applied at the start, as soon as the fluidization of the bed has been adjusted. Under the influence of the alternating magnetic field, the ferromagnetic particles which are strongly paramagnetic, describe very rapid relative transversal movements. Their contact with the acid solution is improved and their speed of dissolution increases. The particles disaggregate little by little, they become finer and finer and advance slowly towards the exit 67 of the columns, whereas the non-ferromagnetic particles detached from the aggregates are drawn permanently by the flow of liquid to the outlet 67. The magnetic stirring hence also facilitates the separation of the insoluble substances. The flow rate emerging through 67 represents 10% of the input flow rate. The outlet 67 is located at the upper portion of the magnetic device, and beneath the calm zone 66.

The particles which escape from the magnetic attraction pass into the flow emerging through 67, and arrive through 64 in a cyclone 69 where they are separated from the liquid. The liquid phase is constituted by a solution of iron sulfate and different metals (other than titanium), close to saturation at the temperature of 65° C. The solid phase constitutes the enriched ore, it contains the titanium in the form of oxide, also a small part of original iron oxide, and other insoluble oxides such as silica, zirconium silicate, alumina, and various heavy metal oxides. The treatment has enabled removal of 70 to 75% of the iron contained in the original ore subjected to the treatment.

As a variation of the present example, a reducing agent is added to the solution prepared at 61 in order to increase the degree of enrichment and to solubilize a greater portion of the heavy metal oxides. By operating with zinc filings, it is possible to increase the efficiency of removal of iron and other impurities. In addition, the discarded liquid phase is richer in ferrous iron, which facilitates subsequent treatment of the discarded liquid.

EXAMPLE V—Lixiviation of a copper matte.

A copper matte containing 40 to 45% of copper, about 20% of iron, of nickel and of sulfur as well as other impurities in lesser amount, is subjected to an oxidizing acid treatment by an aqueous solution of $H_2SO_4/FeCl_3$, in order to pass into solution the copper contained in this matte in the form of sulfides of various types.

The matte being magnetic, this property is exploited to effect the lixiviation in reactors provided with a device which enables the creation, from the outside of the reactors, of a variable magnetic field to whose influence the particles of matte are subjected.

Figure 7:
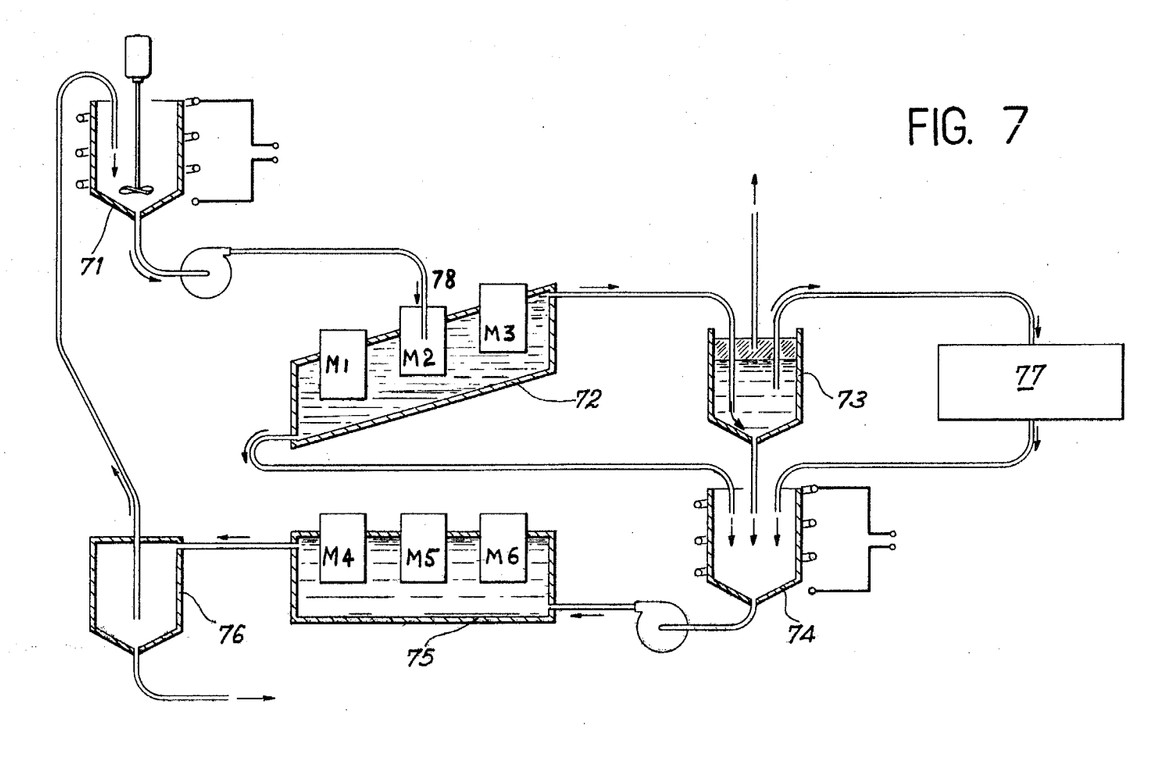
FIG. 7 shows diagrammatically, an installation used in Example V in the field of lixiviation treatment of a copper mat, this installation including two sets of reactors with magnetic stirring according to the invention.

The schematic diagram of the lixiviation is given in FIG. 7. The reactors 72 and 75, of glass fiber reinforced epoxy resin, are each equipped with three electro-magnets M1, M2, M3, and M4, M5, M6, enabling the creation of a field of 0.1 tesla each. The electro-magnets are of annular form and arranged following one another in the path of the product in the corresponding reactor, the latter passing into the air gap of each electro-magnet, whose opposite poles are respectively in front of and behind the plane of the figure, and slightly offset upwards with respect to the level of the reactor.

In the reactor 72, a central inlet 78 enables a suspension of finely ground matte, of residual sulfur and partly exhausted electrolyte, prepared at 71 and brought to the temperature of 100° C., to be introduced. The acidity of the electrolyte as well as the amount of $FeCl_3$ that it contains are sufficient to enable the sulfides and oxides of copper and of iron to be dissolved at 100° C. The result of the attack is the conversion of the matte into soluble species $CuSO_4$, $FeSO_4$, $NiSO_4$, $CuCl$, $FeCl_2$, $NiCl_2$, the $Fe^{+++}$ ions contained in the reaction solution passing into the form of $FeCl_2$ and $Hcl$. Elementary sulfur appears; it is separated at the outlet of the reactor 72 in the decanter 73, where it forms the supernatent layer. The supernatent solution is sent into a copper extraction installation 77 (where it can be applied in any conventional process, or that of example III). In the reactor 72, non-magnetic insoluble fine portions form a mud which is driven from the decanter 73 to the mixer 74. In this mixer, all the residual solid parts, with the exception of the sulfur, coming from the reactor 72 (either directly, or after separation in the decanter 73) are mixed with the regenerated reaction solution coming from the extraction installation 77. The composition of this reaction solution comprises about 150 g/l of $H_2SO_4$ and 150 g/l of $FeCl_3$. The temperature is brought to 100° C. at 74.

The mixture is then introduced into the reactor 75. At the outlet of this reactor, the new solid-liquid mixture is sent into a cyclone 76, whence the solid is separated, which will if necessary be retreated to extract the noble elements such as silver. The solution entrains particles of elementary sulfur. It is this solution which is sent into the mixer 71 wherein the finally ground matte is introduced.

The three electro-magnets M4, M5, M6, which equip the reactor 75 are supplied cyclically one after the other in this order, from a source of 10 Hz alternating voltage to which they are connected through a rotary switch. Thus, the magnetic particles which, on the one hand, are drawn by the flow of liquid from the inlet (near M6) to the outlet (near M4), and which have, on the other hand, a tendency to fall under the influence of gravity, are drawn to describe a reverse path from that of the hydrodynamic flow and are resuspended when the electro-magnets are supplied with current. These particles describe rapid and disordered paths in the reactor. Very thorough stirring and distinctly increased speed of dissolution are thus obtained. In one tenth to the second, the complete supply cycle is traversed; this speed is regulated by the speed of the rotary switch.

In the case of the reactor 72, a path going alternately from M1 to M3 is imparted to the particles by adding an additional switch corresponding to M2; thus the switch successively places the electro-magnets M1, M2, M3, M2, M1, M2, M3, etc. in operating position.

It is possible, by means of this technique, to obtain an extraction ratio of the copper higher than 95%. The technique is characterised also by its cleanliness and by the rapidity of placing in solution. It enables the treatment to be carried out at the boiling temperature of the solution under atmospheric pressure, that is to say under less severe conditions than the usual processes. Moreover, it is possible to avoid certain subsequent steps of the usual processes by sending the solution obtained directly to electrolysis.

By operating under similar conditions to those which have just been described, a nickel matte is processed in the same manner. The lixiviation is considerably improved by the magnetic stirring process, the metal matte containing, like that of copper, ferromagnetic constituents.

EXAMPLE VI—Catalytic hydrogenation

It is possible to hydrogenate unsaturated fatty acids contained in food fats in order to improve the preservation qualities of the fatty acids. In fact, the saturation of the double bonds enables the phenomena of becoming rancid to be avoided.

Figure 8:
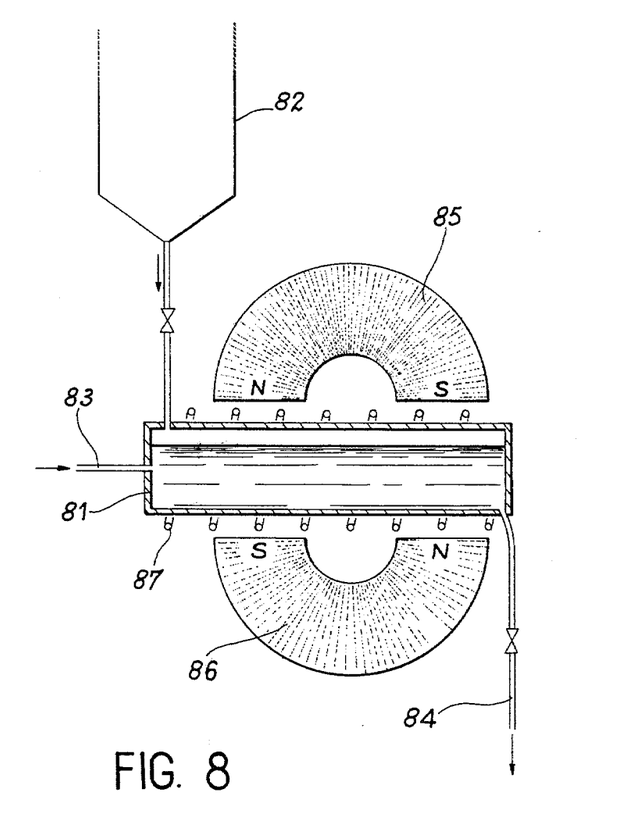
FIG. 8 shows diagrammatically a reactor with magnetic stirring used for hydrogenation treatment of unsaturated fatty acids in Example VI.

By using the apparatus of FIG. 8, the operation is carried out in a tubular autoclave 81, of porcelain, heated by a heating resistor 87. The fat, introduced from the tank 82, fills the tube to ¾. The temperature is maintained at 180° C. The operation is carried out under reduced pressure of hydrogen at constant pressure in the presence of reduced catalytic nickel. The hydrogen is introduced through the pipe 83.

Two electro-magnets 85 and 86 are arranged along the tube, one above the portion containing the gaseous phase, the other beneath the liquid phase. The electro-magnets are semi-circular and wound and supplied so that a North pole is opposite the South pole. A switching device (not shown), but similar to those which were used in the preceeding examples, enables each of the two electro-magnets to be operated alternately by periodically reversing the North and South poles. The nickel describes rapid movements and passes from the liquid phase to the gaseous phase thereby coming into intimate contact with the solution to be reduced. The whole is thus stirred, the nickel is dispersed, and the mass transfer is accelerated without the need for having rotating parts in the autoclave. When the flow rate of the hydrogen becomes zero, one only of the two magnets is supplied permanently, namely 85, so as to hold the catalyst against the upper wall. The treated fat is removed at 84, taking care not to allow air to enter, nor to allow hydrogen to escape. A further batch of the fat for treatment is then introduced.

EXAMPLE VII

This example constitutes a modification of example II. It is distinguished therefrom by the fact that the magnetic particles taking part in the stirring by magnetic induction are rendered inert with respect to the metallic solution treated by electrochemical protection (cathodic). These particles being selected for their magnetic properties, iron is preferred, or possibly cast iron. However the metal of the magnetic particles, which, if it was not protected, could dissolve by displacing the less electropositive impurities in solution, may be taken itself to the potential of a more reducing metal selected to displace the impurities, so as to facilitate the preferential solution of the latter.

In the case concerned with the purification of zinciferous solutions intended for electrolysis containing as impurities less electropositive species such as copper, cobalt, cadmium, antimony, the reducing agent is constituted as in Example II by solid zinc, but the latter may be in a mass and independent of the iron particles, in the form of sheets, bars, or machinings, and even immobile, and the particles in suspension which enable the magnetic stirring, and which are conducting, are borne by their repeated contacts with the zinc to the potential of this metal.

Figure 9:
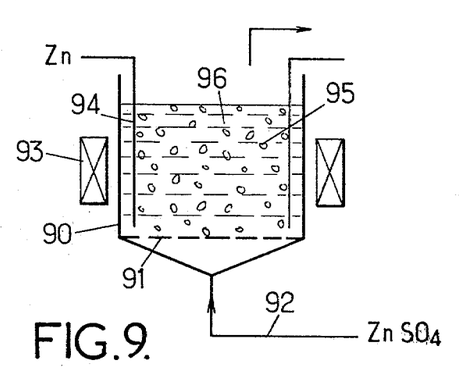
FIGS. 9 and 10 show diagrammatically two modifications of the purification process for zinciferous solutions, described in Examples VII and VIII.

In accordance with FIG. 9, zinc bars 94 dip into the sulfuric zinciferous solution which is introduced through pipe 92 opening at the bottom of the reactor 90, through a grid 91. Above this grid the reactor contains soft iron particles 95-96 which in operation are dispersed in the solution and placed in permanent movement by means of the magnetic stirring ensured by the magnets 93. This stirring is sufficiently energetic for the particles in suspension to acquire by contact with the zinc a potential close to the dissolution potential of the zinc, so that the latter alone is attacked whereas the surface taking part in the displacement reactions of the metallic species is increased by that of the iron particles. The impurities displaced are mainly deposited on these particles, which are then easy to separate from the purified solution since they are held by the magnetic field.

EXAMPLE VIII

The same advantages as in example VII are to be found again in the modification illustrated by FIG. 2, according to which a contribution of electric current is effected ensuring the cathodic protection of the iron particles. In FIG. 10 were again be seen the reactor 100, the retaining grid for the particles 102, the feed pipe for the solution 101 and the magnets 106.

Figure 10:
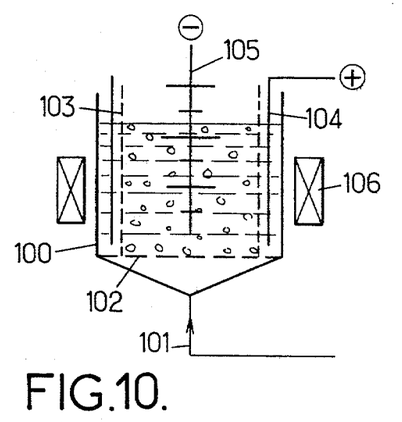

Two electrodes dipping into the solution inside the reactor are connected to an external D.C. source. The anode 104 is arranged annularly around the reaction space containing the iron particles, bounded by a cylindrical diaphragm 103. It is made of titanium, of graphite, or of any other non-ferromagnetic conducting material, in order not to form a screen for entraining particles suspended by the magnets outside the reactor, and not attacked under the conditions of conducting the treatment, or even of zinc. The cathode 105 is arranged in the axis. It comprises lateral extensions which multiply the contacts with the dispersed particles subject to stirring without unduly interfering with their movements. This cathode may be of zinc or of aluminum for a zinciferous solution, but also of another metal taking into account the assured cathodic protection, the voltage being selected sufficiently high to cause the metallic species in solution which constitute the impurities to be removed to be deposited, and even of iron, in spite of the magnetic character of this metal due to the fact of the axial arrangement of the electrode.

The electrochemical reactions occur at the surface of the conducting particles of iron which are brought by contact to the protecting potential of the cathode. Not only is the iron not attacked, but in addition, the external current source avoids the consumption of large amounts of zinc. In addition, the vigorous stirring ensured magnetically generally enables the metallic deposits, notably of copper, which are formed on the iron particles, to be detached by shock. These precipitated impurities are entrained with the liquid and separated from the latter outside of the reactor.

Naturally, and thus also as emerges already from the foregoing, the invention is in no way limited to the particular conditions which have been described within the scope of these examples. In practice, any physical-chemical reactions are capable of being put into operation with stirring by magnetic induction in accordance with the invention and in each particular case the shape and periodicity of the magnetic field applied may be selected so that the activation of the physical processes and/or of the chemical reactions applied, resulting from local disturbances in the vicinity of the particles or elements in suspension, is a maximum.

I claim:

1. A process for promoting physical and/or chemical reactions performed in a fluid medium, comprising moving a magnetic solid material freely dispersed in said fluid medium and formed, at least at the surface, of a substance playing a physical and/or chemical role in said reaction, by subjecting said material to the effect of a variable magnetic field comprising providing the magnetic field with sufficient intensity to impart to the particles of said material momentary speeds of movement relative to the fluid, and varying it, in intensity, position and/or direction, so as to maintain the particles in suspension in the fluid.

2. A process according to claim 1, wherein the magnetic field is varied periodically between two opposite directions in at least one position.

3. A process according to claim 1, wherein said substance is selected to react chemically with at least one constituent in the fluid.

4. A process according to claim 1, wherein said process is applied to a physical and/or chemical reaction bringing into play two products having different magnetic properties.

5. A process according to claim 1, wherein said reaction is an oxido-reduction reaction between a solid substance, constituting at least part of the surface of said magnetic particles, and a relatively non-magnetic compound, constituting said fluid at least partially.

6. A process according to claim 5, wherein said solid substance is ferromagnetic.

7. A process according to claim 1, wherein said reaction is an electro-chemical reaction occurring at the potential of a solid mass immersed in said fluid medium, and wherein said material is formed of conductive particles which reach the potential of the solid mass due to the contact therewith under the effect of stirring due to the variable magnetic field.

8. A process according to claim 1, wherein said material is a magnetic ore and said medium is an acid solution dissolving constituents of said ore into reduced or oxidized ions.

9. A process according to claim 8, wherein said ore is ilmenite and the medium is a sulfuric acid solution dissolving iron from the ore.

10. A process according to claim 8, comprising magnetically dispersing a copper or nickel sulfide ore in an acid oxidizing solution.

11. A process according to claim 1, wherein said fluid medium is a zinc containing solution with undesired ions from metals less electropositive than zinc and said material is made of magnetic particles covered with zinc thereby causing exchange of said undesired ions from the dissolved state with said zinc from the particles.

12. A process according to claim 1, wherein said fluid medium is a zinc containing solution with undesired ions from metals less electropositive than zinc and said material is made of iron conductive particles and wherein solid zinc metal is immersed in said medium, the particles being contacted with said metal due to their movements under said variable magnetic field thereby causing deposition of solid undesired ions.

13. A process according to claim 1, wherein said fluid medium is a zinc containing solution with undesired ions from metals less electropositive than zinc and said material is made of iron conductive particles and the reaction is carried out in the presence of a cathode at the di-solution potential for zinc and with which the particles are contacted due to their movements under said variable magnetic field thereby causing deposition of said undesired ions.

14. A process for promoting physical and/or chemical reactions performed in a fluid medium comprising moving a magnetic solid material freely dispersed in said fluid medium and formed, at least at the surface, of a substance playing a physical and/or chemical role in said reaction, by subjecting said material to the effect of a variable magnetic field, wherein said reaction is an oxido reduction reaction involving the exchange of a metal from the solid state with a metal from the dissolved state.

15. A process according to claim 1, wherein said fluid medium is a dilute copper solution and said magnetic material is composed of dispersed iron particles.

16. A process according to claim 1, wherein said reaction is a catalytic hydrogenation reaction of a liquid phase, comprising constituting said solid material by magnetic particles coated with a catalytic agent and using said variable magnetic field to agitate said particles and make said particles circulate repeatedly through part of the liquid phase and through part of a gaseous hydrogen phase.

17. A process according to claim 16 wherein said particles are coated with zinc.

18. A process according to claim 1, wherein the fluid medium is flowing in one direction and the magnetic field is continuously varied and has at least one component transverse to the direction of flow.

* * * * *

UNITED STATES PATENT AND TRADEMARK OFFICE
CERTIFICATE OF CORRECTION

PATENT NO. : 4338169
DATED : July 6, 1982
INVENTOR(S) : Gerard Bienvenu

It is certified that error appears in the above-identified patent and that said Letters Patent are hereby corrected as shown below:

| | |
|---|---|
| Column 2, line 15 | The word "fo" should be -- of --. |
| Column 5, line 27 | The word "incorporation" should be -- incorporating --. |
| Column 10, line 19 | The word "described" should be -- describes --. |
| Claim 11, line 1 (Col 15, line 35) | The numeral "1" should be -- 14 --. |
| Claim 12, line 1 (Col. 15, line 42) | The numeral "1" should be -- 14 --. |
| Claim 13, line 1 (Col. 16, line 7) | The numeral "1" should be -- 14 --. |

Signed and Sealed this

Seventh Day of December 1982

[SEAL]

Attest:

GERALD J. MOSSINGHOFF

Attesting Officer        Commissioner of Patents and Trademarks